(12) United States Patent  
Troxel et al.

(10) Patent No.: US 8,170,018 B2  
(45) Date of Patent: May 1, 2012

(54) NO-SIGHT ROUTING FOR AD-HOC NETWORKS

(75) Inventors: Gregory Donald Troxel, Stow, MA (US); Stephen Henry Polit, Belmont, MA (US); Subramanian Ramanathan, Westford, MA (US)

(73) Assignees: Verizon Corporate Services Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 0 days.

(21) Appl. No.: 12/821,662

(22) Filed: Jun. 23, 2010

(65) Prior Publication Data

US 2010/0322240 A1    Dec. 23, 2010

Related U.S. Application Data

(63) Continuation of application No. 11/087,430, filed on Mar. 23, 2005, now Pat. No. 7,768,943.

(60) Provisional application No. 60/555,980, filed on Mar. 25, 2004.

(51) Int. Cl.
*H04L 12/28* (2006.01)
*H04L 12/56* (2006.01)
*H04J 3/16* (2006.01)
*H04J 3/22* (2006.01)
*H04J 3/14* (2006.01)

(52) U.S. Cl. .......... 370/389; 370/235; 370/468
(58) Field of Classification Search ........ 370/235, 370/389, 468
See application file for complete search history.

(56) References Cited

U.S. PATENT DOCUMENTS

| | | | |
|---|---|---|---|
| 5,922,049 A | 7/1999 | Radia et al. | |
| 6,061,650 A * | 5/2000 | Malkin et al. | 704/228 |
| 6,195,705 B1 | 2/2001 | Leung | |
| 6,356,945 B1 * | 3/2002 | Shaw et al. | 709/231 |
| 6,445,922 B1 * | 9/2002 | Hiller et al. | 455/433 |
| 6,775,298 B1 | 8/2004 | Aggarwal | |
| 6,845,084 B2 | 1/2005 | Rangnekar et al. | |
| 7,039,025 B1 | 5/2006 | Menon et al. | |
| 7,397,785 B2 | 7/2008 | Wu et al. | |
| 2002/0196808 A1 * | 12/2002 | Karri et al. | 370/468 |
| 2003/0119508 A1 | 6/2003 | Gwon et al. | |
| 2003/0210787 A1 | 11/2003 | Billhartz et al. | |
| 2004/0024877 A1 * | 2/2004 | Celle | 709/226 |
| 2004/0066757 A1 * | 4/2004 | Molteni et al. | 370/329 |
| 2007/0271396 A1 | 11/2007 | Chen et al. | |
| 2008/0039079 A1 | 2/2008 | Iyer et al. | |

* cited by examiner

Primary Examiner — Ronald Abelson

(57) ABSTRACT

A system comprising a plurality of nodes forming a network, the plurality of nodes comprising source nodes and destination nodes; wherein a propagation limit restricts the travel of link-state information transmitted by the sources nodes to a subset of destination nodes within the network. A network-layer protocol provided at a layer above that of the network facilitates communication between nodes within and outside of this subset of nodes.

22 Claims, 6 Drawing Sheets

NO-SIGHT ROUTING FOR AD-HOC NETWORKS

RELATED APPLICATIONS

This application is a continuation of U.S. patent application Ser. No. 11/087,430, entitled "NO-SIGHT ROUTING FOR AD-HOC NETWORKS", filed on Mar. 23, 2005, which claims priority from U.S. Provisional Patent Application No. 60/555,980, entitled "NO-SIGHT ROUTING FOR AD-HOC NETWORKS", filed on Mar. 25, 2004. In addition, the present application relates to U.S. patent application Ser. No. 11/087,406, entitled "VARIABLE TRANSLUCENCY NO-SIGHT ROUTING FOR AD-HOC NETWORKS", filed on Mar. 25, 2004; U.S. patent application Ser. No. 09/736,827, entitled "NETWORK COMMUNICATION BETWEEN HOSTS", filed Dec. 14, 2000; U.S. patent application Ser. No. 09/736,807, entitled "DELIVERING MESSAGES TO A NODE AT A FOREIGN NETWORK", filed Dec. 14, 2000; U.S. patent application Ser. No. 09/737,108, entitled "PUBLISHING NODE INFORMATION", filed Dec. 14, 2000; and U.S. patent application Ser. No. 09/736,834, entitled "ROUTING MESSAGES BETWEEN NODES AT A FOREIGN SUB-NETWORK", filed Dec. 14, 2000. The contents of all of these applications are hereby incorporated by reference in their entirety.

BACKGROUND INFORMATION

In recent years, the use of wireless communication networks as a system for facilitating communication between various types of mobile devices, such as portable computers, personal digital assistants ("PDAs"), cellular telephones and the like, has gained widespread acceptance. In particular, there has been a growing trend at developing infrastructure-less network technologies to facilitate direct communication between two or more wireless devices. When two or more devices directly communicate without any infrastructure, they form a type of local area network ("LAN") known as an ad-hoc network. Due to the mobility of the devices involved, the topology of ad-hoc networks is typically subject to rapid changes, such as when devices are added, removed or moved from one location to another within the network.

Wireless devices may form or become part of an ad-hoc network when they are located within the range of at least one other wireless device. Each device (or "node") in the ad-hoc network may serve as a client, host, or router. Currently, a number of wireless technologies exist for supporting ad-hoc networks, including ones using standard protocols such as Bluetooth, Infrared Data Association ("IrDA"), and IEEE 802.11x. Ad-hoc networks are not limited to wireless devices and some or all of the devices in an ad-hoc network may use temporary wired connections that allow these devices to temporarily be part of the network, such as for the duration of a communications session.

Ad-hoc networks face a number of challenges. These challenges can be roughly divided into two main categories: physical layer issues (such as physical connectivity problems due to weak signal strength, etc.) and network layer issues (including network management and routing difficulties). Although physical layer connectivity is, of course, a prerequisite for network connectivity, recent improvements in physical connectivity have not been matched by improvements in network management and routing techniques.

For example, according to one conventional routing approach, every node in a network receives, through a process known as "flooding", enough information to build a complete map of the network. During flooding, each switching node (i.e., nodes that are configured to forward data packets) forwards a link-state packet ("LSP") to all nodes to which it is directly connected. Typically, link-state packets contain data detailing the ID of the node that created the LSP and a list of directly connected neighbors of that node.

Each switching node that receives this LSP then forwards the packet to its directly connected neighbors, which then forwards the same packet to its directly connected neighbors, and so on until the LSP has been forwarded to each node within the network. Once a given node has received an LSP from every other node in the network, it is able to compute a complete map of the topology of the network. Each node in the network is thus able to determine, based on the computed map, the least-cost path to any destination node in the network. Changes in network topology are accounted for by requiring each switching node to transmit a link-state update ("LSU") upon any perceived change in network topology (i.e., a neighbor of the switching node is disconnected or added). Typically, link-state updates contain data detailing the ID of the node that created the LSU and a list of directly connected neighbors of that node.

Although relatively simple in its implementation, this conventional routing approach (commonly known as "link-state" routing) suffers from a number of limitations, particularly when adapted for use in wireless ad-hoc networks. For example, in link-state routing, every node must have and store sufficient information to compute the location of every other node in the network. More particularly, because ad-hoc networks typically have flat address space (i.e., the addresses of each node do not identify a hierarchical relationship due to lack of central administration and constant motion), the routing table for each node, in such networks must contain information about each and every other node. As the number of nodes connected to the network increases, the corresponding number of link-state packets and updates that must be transmitted, received and stored by each node also increases. When the amount of link-state traffic exceeds the physical capabilities of the hardware of the network, the network may become unreliable or fail. Thus, unacceptable increases in the amount of link-state data and traffic serve to limit the network's scalability potential by inhibiting the number of nodes that may feasibly connect to the network.

In addition, because switching nodes in a link-state routing scheme are required to transmit LSUs upon every perceived change in network topology, an inordinate number of LSUs may be propagated within the network due to the relatively high frequency with which topology changes occur in ad-hoc networks. This results in large amounts of routing traffic overhead being transmitted within the network, which may further limit the workable size of the ad-hoc network and lead to degradation of network performance and reliability. Given that wireless communications within a network may often be at lower bandwidths than wired communications, reducing overhead to maximize the total available bandwidth for substantive communications is highly desirable.

According to another approach, instead of allowing every link-state update generated by each switching node to fully flood the entire network, global LSUs (i.e., LSUs that are allowed to propagate throughout the entire network) are transmitted only on a periodic basis. Global LSUs typically represent LSUs having a time-to-live value ("TTL", a value that specifies how far the LSU will propagate prior to expiring) set to infinity to allow the LSU to propagate throughout the entire network.

In this approach, known as "hazy-sighted" routing, each switching node transmits a global LSU during initial configuration of the network, thereby providing each node within the network with sufficient information to compute a complete map of the entire network. Thereafter, global LSUs are only transmitted upon the expiration of a period of time specified by a periodic timer. Between global LSU transmissions, non-global LSUs are transmitted. Typically, the TTL value of each non-global LSU is set to a value smaller than that of the size of the network so that they do not propagate throughout the entire network. Upon expiration of the period of time specified by the periodic timer, each switching node again transmits a global LSU.

Because global LSUs are only transmitted within this hazy-sighted routing scheme on a periodic basis, during certain periods of time various nodes within a network implementing this routing protocol may lack up-to-date information regarding the exact location of every other node in the network. Thus, although nodes may have received sufficient information to compute an up-to-date map of their surrounding region (as determined by the TTL value of the most recent non-global LSU), their understanding of the location of or best path to distant nodes (i.e., nodes outside of their horizon line) may be based on out-of-date information (as determined by the most recent global LSU).

Hazy-sighted routing thus allows information about distant nodes to be inexact, such that a switching node always knows how to get a packet closer to a destination node, but may not always know the details of the best path to this destination node. Once a transmitted packet has been forwarded to a node that is closer to the destination node, more information about this path is provided, and so on at the next closest node until the packet eventually arrives at the destination node. Inasmuch as the number of topological changes that might occur within the time specified by the periodic timer is likely to be greater than one, this periodic timing limitation serves to reduce the number of LSUs generated, thereby limiting the amount of traffic overhead promulgated within the network. Hazy-sighted routing thus sacrifices accuracy in favor of reduced link-state overhead.

As with the traditional link-state approach to routing described above, the so-called "hazy-sighted" routing approach suffers from similar scalability, performance and reliability concerns. For example, it is still necessary for the routing table to contain information about each and every node. Global LSUs are essential to providing such information. Thus, as discussed above, the use of global LSUs limits scalability, network performance and reliability.

Accordingly, there exists a need for a system and method capable of enabling nodes within an ad-hoc network to seamlessly communicate with adjacent nodes, distant nodes and a wider network (such as the Internet) so long as physical connectivity is maintained with at least one other node. There also exists a need for a system and method capable of scaling beyond the size limitations of traditional ad-hoc networks, while minimizing any potential decreases in network performance and reliability. Preferably, such a system and method would provide significant improvements in scalability, application performance and overall network connectivity.

DETAILED DESCRIPTION OF PREFERRED EMBODIMENTS

I. System Overview a. No Sight Routing

Figure 1:
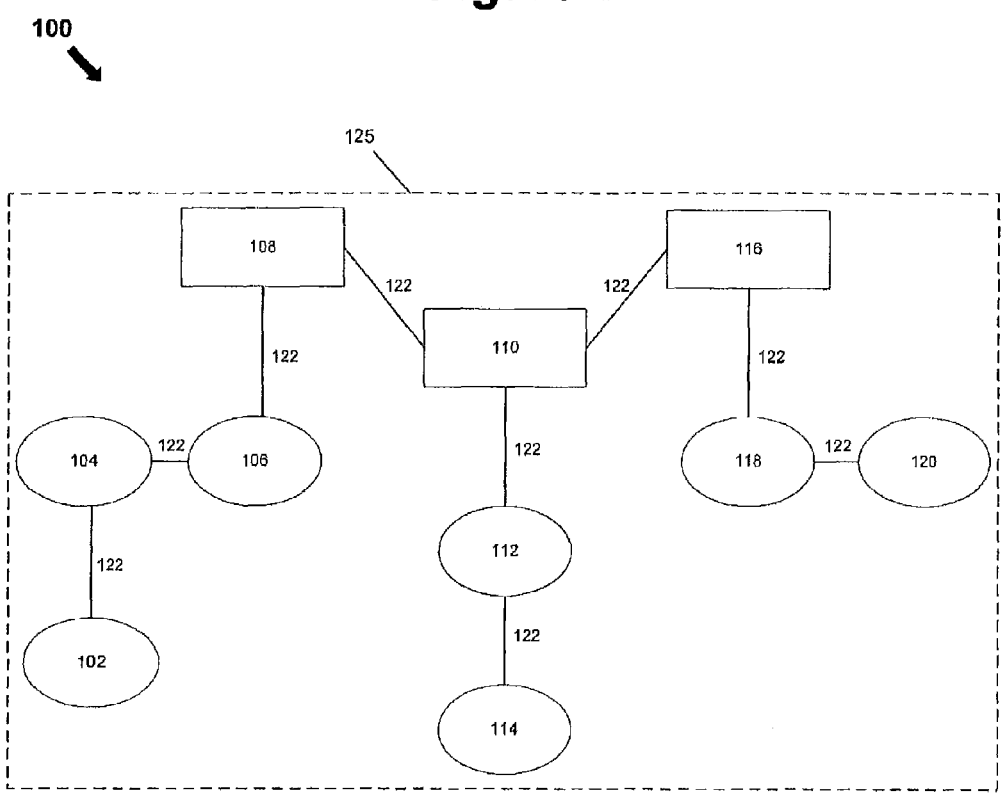
FIG. 1 illustrates an exemplary physical topology of a network for implementing a routing protocol.
Figure 2:
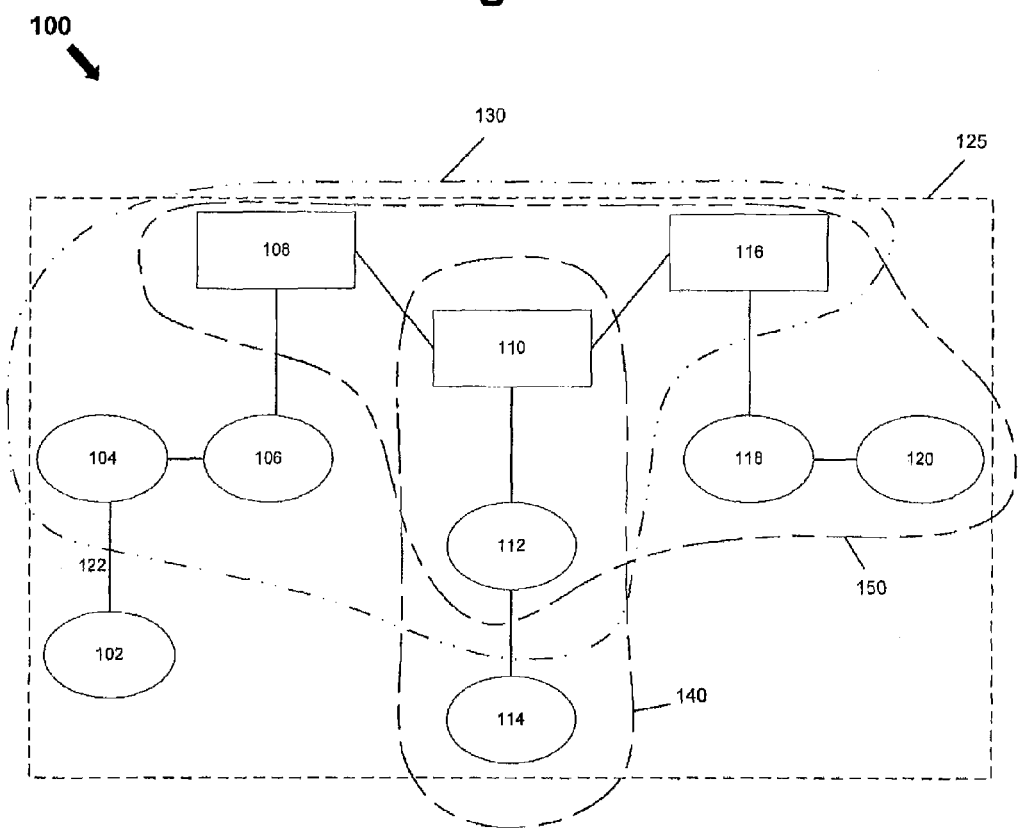
FIG. 2 illustrates an exemplary physical topology of a network for implementing an exemplary no-sight routing protocol.

FIG. 1 is a block diagram illustrating an exemplary physical infrastructure of a system 100 for implementing a no-sight routing protocol. FIG. 2 illustrates an exemplary physical topology of a sub-network 125 implementing an exemplary no-sight routing protocol with predetermined propagation limits.

Exemplary system 100 generally comprises, among other things, nodes 102, 104, 106, 108, 110, 112, 114, 116, 118 and 120. Nodes 102-120 are connected to one another via connections 122, which may include any number of connections recognized in the art, including, for example, wires, wireless communication links, fiber optic cables, etc. Nodes 102-120 connected together via connections 122 collectively form sub-network 125.

In general, nodes 102-120 represent connection terminals within exemplary sub-network 125. In some embodiments, a protocol operating on a network above that of sub-network 125 (as will be described in greater detail below) distinguishes between nodes 102-120 based on their packet-forwarding capabilities. For example, in some embodiments a protocol operating on a network above that of sub-network 125 recognizes oval-shaped nodes 102, 104, 106, 112, 114, 118 and 120 as representing "hosts" (i.e., nodes which only forward originating packets, as will be known to those of skill in the art) and rectangular-shaped nodes 108, 110, and 116 as representing "routers" (i.e., nodes which forward/route non-originating packets). This host/router distinction is not, however, made within sub-network 125. Within sub-network 125, all nodes are viewed as being directly connected; i.e., any node can send data to any other node.

According to certain embodiments, one or more of nodes 102-120 collectively forming exemplary sub-network 125 may be a mobile node. Generally speaking, a mobile node is a device whose location and point of attachment to exemplary sub-network 125 may frequently change. Examples of mobile nodes include cellular telephones, handheld devices, PDAs, and portable computers.

In many embodiments, the travel of a packet from any source node in sub-network 125 is limited by at least one predetermined limiting value. The factors that contribute to the potential limiting value include, for example, the physical distance the data packet has traveled from the source node, the aggregate bandwidth capacity of the links over which the data packet has traveled, the number of nodes through which the data packet has passed, and the amount of time that has passed since the data packet was transmitted from the source node.

For purposes of simplicity, the term "propagation limit" will be used hereinafter to collectively refer to application of one or more of the above-described predetermined limiting values. Further, the time, distance, etc. that a data packet travels or propagates within a network will be referred to as a "propagation parameter". In addition, generally speaking, the phrase "no-sight routing" will be hereinafter used to refer to systems and methods in which the propagation parameter of a data packet is limited by a propagation limit.

According to some embodiments, a propagation limit is a hop limit. Generally, "hop" refers to the trip a data packet takes from one node to the next, while "hop limit" refers to the maximum number of hops that a packet may propagate. A propagation limit may also be, for example, a time-to-live value such as will be known to those of skill in the art, or a variable translucency time-to-live value. Variable translucency time-to-live values are discussed in greater detail in U.S. patent application Ser. No. 11/087,406, entitled "VARIABLE TRANSLUCENCY NO-SIGHT ROUTING FOR AD-HOC NETWORKS", filed on the same day as the instant application.

FIG. 2 illustrates the concept of propagation limit, with horizon lines 130, 140 and 150 representing exemplary propagation limit boundaries for nodes 108, 114 and 116, respectively. In this example, an arbitrary hop limit of 2 is chosen as the propagation limit for nodes 108, 114 and 116 within sub-network 125. Accordingly, exemplary horizon line 130 illustrates that packets originating from node 108 may only travel two hops, encompassing nodes 104, 106, 110, 112 and 116. Similarly, exemplary horizon line 140 illustrates that packets originating from node 114 may only travel to nodes 110 and 112, while exemplary horizon line 150 illustrates that packets originating from node 116 may only travel to nodes 108, 110, 112, 118 and 120.

Although the propagation limit discussed in connection with FIGS. 1 and 2 is illustrated as being equal to 2, it is to be understood that the propagation limit may be set to any value or number, or be based on any algorithm, heuristic, etc. According to some embodiments, the propagation limits of all data packets transmitted within sub-network 125 are established irrespective of the type of data packet being transmitted. Alternatively, propagation limits for data packets propagated within sub-network 125 may be established at least in part on the type of data packet being propagated. For example, the value of a specific propagation limit may be set or adjusted based at least in part on whether the data packet in question is an LSP, an LSU, a multicast member LSU (used in multicasting, as will be well known to those of skill in the art), unicast data packet, or a multicast/broadcast data packet.

In many embodiments, the propagation limits of all data packets transmitted within sub-network 125 are set to equal values. For example, the propagation limits of all LSPs, LSUs (including multicast member LSUs), unicast data packets, and multicast/broadcast data packets propagated within a network might be set to an arbitrary hop limit of 5. Alternatively, only a portion or none of the data packets propagated within sub-network 125 may be configured to have equal propagation limits.

However, it should be noted that various efficiencies are lost when the propagation limits of all data packets are not set to equal values. For example, if the propagation limit of an LSU originating from a source node is set to a hop limit of 5, while the propagation limit of a unicast data packet from this same source node is set to a hop limit of 10, then this source node will be able to send packets to nodes up to 10 hops away, but will only be able to see routes for nodes within 5 hops. Conversely, if the propagation limit of an LSU originating from a source node is set to a hop limit of 10, while the propagation limit of a unicast data packet from this same source node is set to a hop limit of 5, then this source node will be able to see routes for nodes up to 10 hops away, but will only be able to send packets to nodes within 5 hops.

Thus, although in many embodiments the propagation limits of all data packet types are set to equal values, in some embodiments the propagation limit of a unicast data packet originating from a source node is preferably at least as large as that of an LSU originating from the same source node to ensure that all routes "seen" by the source node can be reached. In addition, to ensure communication between a source node and a destination node, the propagation limits for both the source node and the destination node are preferably equal to or greater than the propagation parameter between these nodes.

With respect to multicast/broadcast data packets, in certain embodiments it may be desirable to allow the propagation limits of a multicast member LSU to differ from the propagation limit of a multicast data packet. For example, the propagation limit of a multicast data packet from a source node may be set to a higher value than the propagation limit of a multicast member LSU for this source node. Setting the propagation limits in this manner enables the source node to send discovery or advertisement messages to a group of nodes, since explicit routes are not generally needed for such discovery messages. Nodes receiving such discovery messages will not, however, be able to reply to the source node.

In some embodiments, the propagation limits of data packets within sub-network 125 are dynamically adjusted based on a variety of factors, such as node density, network traffic volumes, and other network conditions. Propagation limits for each node within exemplary sub-network 125 may also be coordinated so as to gradually vary across the network topology, based on a pre-determined heuristic. For example, in certain embodiments the propagation limit of each source node in an exemplary sub-network 125 might be required to differ from the propagation limit of each destination node by no more than PP/x, where PP is equal to the propagation parameter between these nodes (e.g., the number of hops between these nodes, the physical distance between these nodes, the time required to travel between these nodes, etc) and x is equal to a predetermined propagation limit variation value.

For example, in a network where the propagation limits of nodes are set to vary by no more than PP/5 (5 being chosen as an exemplary value for propagation limit variation value x), a destination node 5 hops away from a source node in this network would be required to have a propagation limit that differs by no more than 1 (PP/5=5/5=1) from the source node. Defining the relationships between the propagation limits of each node in a network in this exemplary manner thus ensures that propagation limits throughout the network's topology will vary by no more than a predetermined amount. Generally speaking, while the propagation limit variation value x may be any number or value desired, higher propagation limit variation values x result in smaller amounts of propagation limit variation throughout a network's topology.

Although the propagation limit for each node in exemplary sub-network 125 may be set to any value or number, or set or dynamically adjusted based on any algorithm, heuristic, etc., it should be recognized that lower propagation limits generally improve the scalability of the sub-network (due to reduced sub-network layer overhead), while higher propagation limits result in expanded horizon lines for each node within the sub-network. In certain embodiments, the optimum value for maximizing these competing concerns has been found to fall within a hop limit range of 5-10.

According to the exemplary, no-sight routing system described above, because the travel of data within exemplary sub-network 125 is limited by a predetermined propagation limit, nodes need not transmit nor store information about distant nodes falling outside of their respective horizon lines. The network overhead price paid by conventional routing protocols (where every node is required to know the location of all other nodes in the network, and where sub-network-layer routing traffic is required to convey that information) is thus advantageously avoided. In particular, because the use of global LSUs (and the sub-network-layer routing traffic associated with these global LSUs) is eliminated in no-sight routing, ad-hoc networks of arbitrarily large physical extent may be created without suffering from the various scalability, reliability and performance limitations discussed in connection with conventional link-state routing schemes.

Moreover, because no-sight routing enables the formation of ad-hoc networks of arbitrary physical extent, nodes no longer need to be assigned to particular ad-hoc sub-networks in order to partition the overall network into manageable and workable portions (such as when a conventional network of 10,000 nodes is partitioned into 100 different sub-networks of 100 nodes). This results in a reduction of the configuration operations required and leads to increased ease-of-use and node interoperability, such that all nodes may seamlessly interoperate with one another so long as they are within their respective horizon lines. No-sight routing thus obtains the reachability benefits of an ad-hoc network while addressing traditional scaling and configuration limitations.

b. No-Sight Routing & Network-Layer Protocols

Figure 3:
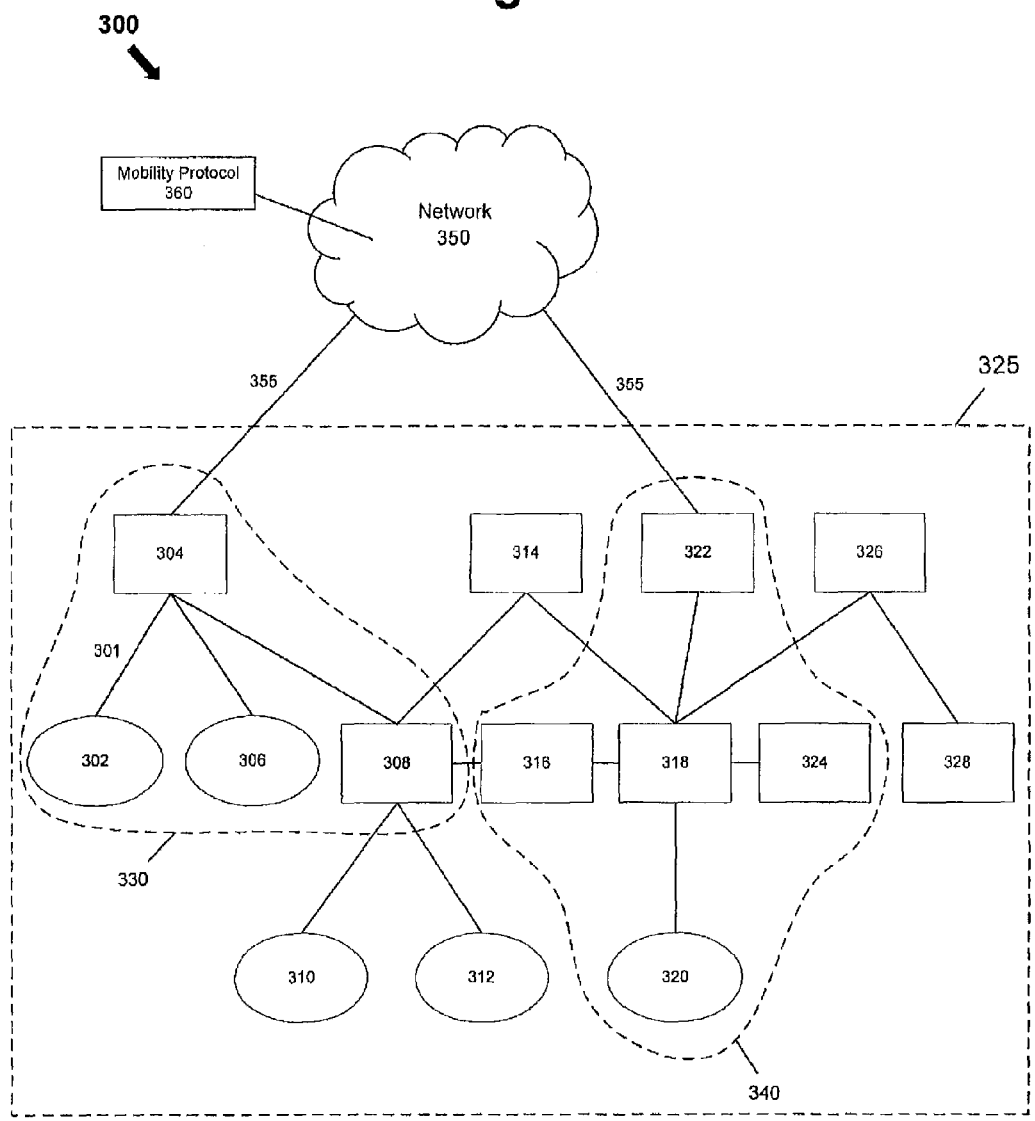
FIG. 3 illustrates an exemplary physical infrastructure of a system for implementing protocols at a network layer and at a sub-network layer.

As detailed above, no-sight routing limits the propagation range of nodes in an ad-hoc sub-network such that these nodes may not "see" or communicate with distant nodes outside of their respective horizon lines. For example, as seen in FIG. 3, mobile node 302 may be limited to an arbitrary propagation limit of 2, as represented by horizon line 330. Similarly, mobile node 320 may be limited to an arbitrary propagation limit of 2, as represented by horizon line 340. Thus, since the topological location of mobile node 302 falls outside horizon line 340 of mobile node 320 and vice versa, communication between mobile node 302 and mobile node 320 may not be established solely through no-sight routing.

Figure 4:
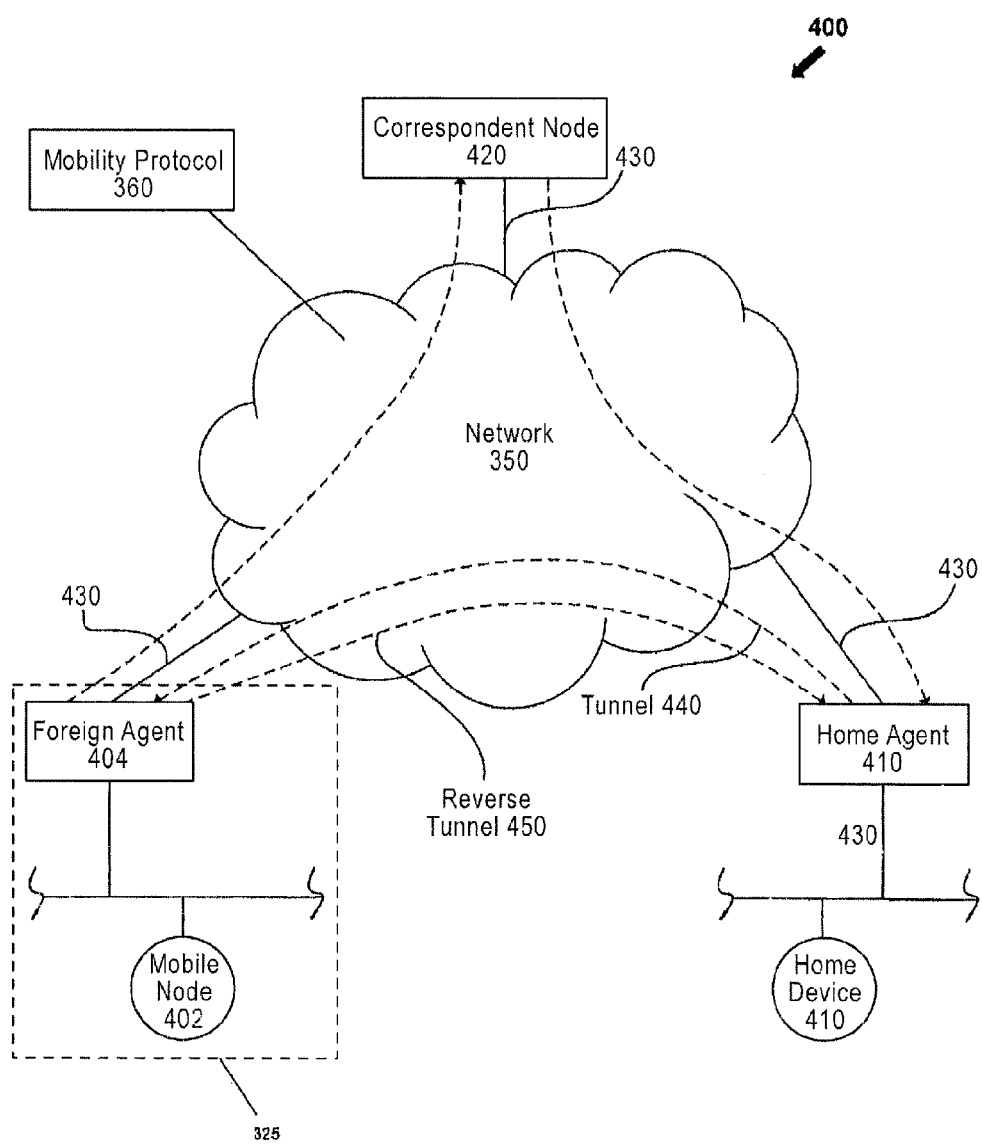
FIG. 4 illustrates an exemplary physical infrastructure of a system for implementing a mobility protocol.
Figure 5:
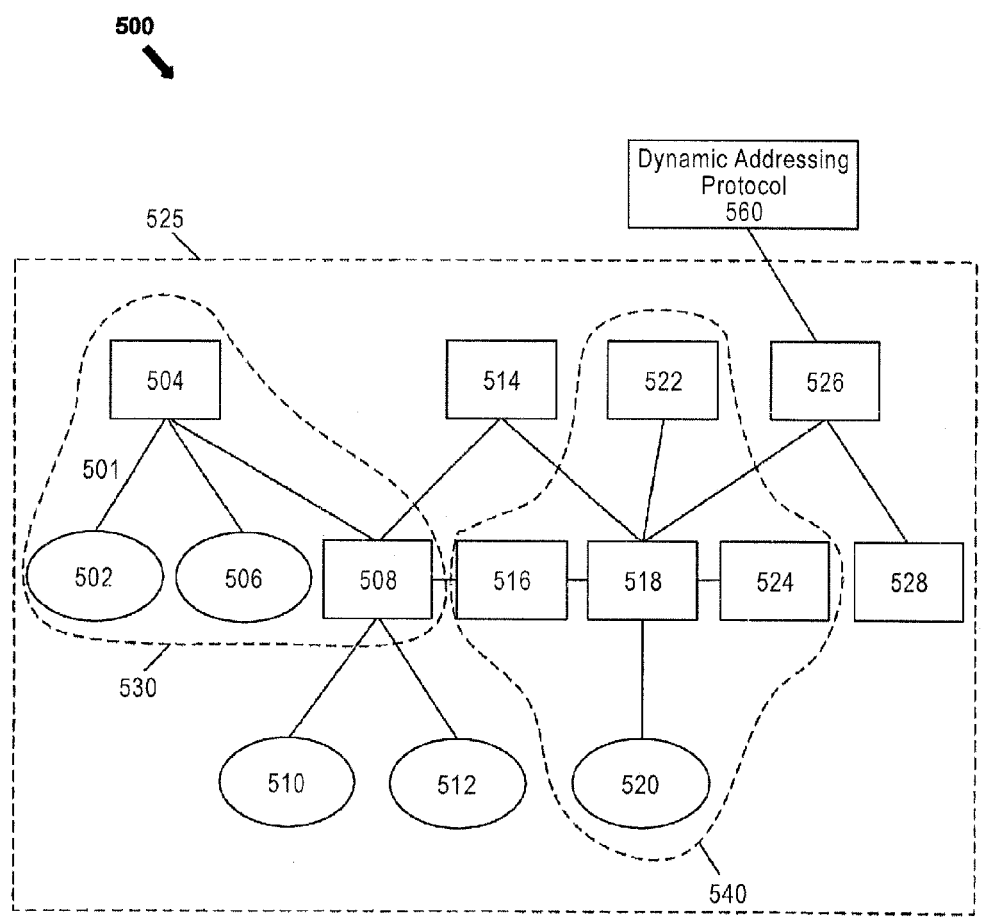
FIG. 5 depicts an exemplary physical infrastructure of a system for implementing a dynamic addressing protocol.

To facilitate communication between distant nodes, in many embodiments a network-layer protocol is provided at a layer above that of the sub-network. This network-layer protocol generally represents any protocol capable of enabling communication between distant nodes, including, for example, mobility protocols and dynamic addressing protocols. FIGS. 3 and 4 illustrate an exemplary physical infrastructure of a system 300 for implementing a no-sight routing protocol at exemplary sub-network 325 and a mobility protocol 360 at network 350. FIG. 5 depicts an exemplary physical infrastructure of a system 500 for implementing a dynamic addressing protocol 560.

Generally speaking, mobility protocol 360 is a routing protocol capable of enabling mobile nodes to use an address, such as an Internet Protocol ("IP") address, at other than their topologically correct location without having to insert host routes into the global routing table of network 350. Examples of mobility protocol 360 include IEFT-standard Mobile IP, Mobile IP version 6 (MIPv6), Hierarchical Mobile IP version 6 (MHIPv6) and OBS Mobility (on-board switch mobility). OBS Mobility is discussed in detail in U.S. patent application Ser. No. 09/736,827, entitled "NETWORK COMMUNICATION BETWEEN HOSTS", filed Dec. 14, 2000; U.S. patent application Ser. No. 09/736,807, entitled "DELIVERING MESSAGES TO A NODE AT A FOREIGN NETWORK", filed Dec. 14, 2000; U.S. patent application Ser. No. 09/737,108, entitled "PUBLISHING NODE INFORMATION", filed, Dec. 14, 2000; and U.S. patent application Ser. No. 09/736,834, entitled "ROUTING MESSAGES BETWEEN NODES AT A FOREIGN SUB-NETWORK", filed Dec. 14, 2000.

Exemplary system 300 for implementing mobility protocol 360 comprises, among other things, nodes 302, 304, 306, 308, 310, 312, 314, 316, 318, 320, 322, 324, 326 and 328. Nodes 302-328 are connected to one another via connections 301, which generally include any number of connections recognized in the art, such as, for example, wireless communication links. Nodes 302-328 connected together via connections 301 collectively form sub-network 325. Although one or more of nodes 302-328 may be a host (stationary or mobile node) or a router, for purposes of simplicity oval-shaped nodes 302, 306, 310, 312 and 320 will be referred to hereinafter as mobile nodes, while rectangular-shaped nodes 304, 308, 314, 316, 318, 322, 324, 326 and 328 will be referred to hereinafter as routers.

In certain embodiments, sub-network 325 is connected to network 350 via connections 355, which may include any number of connections recognized in the art, including, for example, wires, wireless communication links, fiber optic cables, etc. Network 350 may represent any number of telecommunications or computer networks known to those skilled in the art, including, for example, an intranet, a wide area network (WAN), or the Internet. In at least one embodiment, mobility protocol 360 operates at network 350.

In order for mobility protocol 360 to enable communication between each mobile node in sub-network 325, each mobile node must be physically connected, either directly or through another node, to a router. Thus, in some embodiments the propagation limits of each mobile node in exemplary sub-network 325 are chosen to allow each mobile node to transmit to and receive data from (i.e., establish two-way communication) at least one router. More specifically, the propagation limits of each mobile node are preferably chosen such that each mobile node is capable of performing each of the following operations with at least one router: 1) receiving LSPs/LSUs from the router, 2) transmitting LSPs/LSUs to the router; 3) receiving data packets (unicast, multicast, etc.) from the router; and 4) transmitting data packets to the router.

In addition, some embodiments of mobility protocol 360 require a connection between each router in sub-network 325 and network 350. This connection may occur directly (such as via connection 355 between router 322 and network 350) or indirectly (such as via connection 301 between router 318 and 322, with router 322 in turn being connected directly to network 350). Examples of mobility protocols requiring this physical connection to network 350 include the various versions of Mobile IP.

In other embodiments of mobility protocol 360, a physical connection between routers in sub-network 325 and network 350 is only required during an initial registration period (to be explained in greater detail below), after which the connection to network 350 may be terminated. Examples of mobility protocols capable of operating without this physical connection to network 350 include OBS Mobility, which is described in detail in U.S. patent application Ser. No. 09/736,827, entitled "NETWORK COMMUNICATION BETWEEN HOSTS", filed Dec. 14, 2000; U.S. patent application Ser. No. 09/736,807, entitled "DELIVERING MESSAGES TO A NODE AT A FOREIGN NETWORK", filed Dec. 14,2000; U.S. patent application Ser. No. 09/737,108, entitled "PUBLISHING NODE INFORMATION", filed Dec. 14, 2000; and U.S. patent application Ser. No. 09/736,834, entitled "ROUTING MESSAGES BETWEEN NODES AT A FOREIGN SUB-NETWORK", filed Dec. 14, 2000.

An exemplary integration of mobility protocol 360 operating at network 350 for facilitating distant node communication is illustrated in FIG. 4. System 400 generally comprises, among other things, mobile node 402, foreign agent 404, home agent 410, and correspondent node 420, each of which is connected to network 350 via connections 430. In many embodiments, mobile node 402 in FIG. 4 is the same device as mobile node 302 in FIG. 3, foreign agent 404 in FIG. 4 is the same device as router 304 in FIG. 3, and correspondent node 420 in FIG. 4 is the same device as mobile node 320 in FIG. 3.

According to one approach, mobility protocol 360 assigns the "home address" of mobile node 402 to home device 425 in a manner well known to those of skill in the art. Generally speaking, the home address of mobile node 402 refers to a semi-permanent IP address to which other nodes in network 350 (such as correspondent node 420) may address packets destined for mobile node 402. By assigning the home address of mobile node 402 to home device 425, which is connected to home agent 410 via connection 430 and is typically located at a mobile node user's office or home base facility, nodes desiring to communicate with mobile node 402 need not be updated regarding the topological location of mobile node 402 as it moves to various connection points on network 350.

When mobile node 402 is transported outside of its home network (such as when it connects to exemplary sub-network 325), mobile node 402 may obtain packets transmitted to its home address by registering with foreign agent 404 through a process well known to those of skill in the art. During this registration process, mobility protocol 360 assigns, based on the address of foreign agent 404, a "care-of" address to mobile node 402. Foreign agent 404 then in turn registers with home agent 410 to exchange information regarding the home and care-of addresses of mobile node 402. Once this three-way registration process has occurred, home agent 410 acts to forward all packets addressed to the home address of mobile node 402 (such as from correspondent node 420) to the care-of address of mobile node 402 provided by foreign agent 404.

In many embodiments, these packets are forwarded from home agent 410 to foreign agent 404 via a tunnel 440 by a process known as "tunneling". Generally speaking, tunneling involves having home agent 410 encapsulate packets originally addressed to mobile node 402 inside an IP header that addresses the encapsulated packet to the care-of address of mobile node 402. The encapsulated packets are then transmitted by home agent 410 to foreign agent 404 via network 350. Upon receipt of this encapsulated packet, foreign agent 404 decapsulates and forwards the tunneled packets received from home agent 410 to mobile node 402.

According to certain embodiments, upon receipt of the tunneled packets, mobile node 402 then either sends packets to other nodes through network 350 via foreign agent 404, or reverse-tunnels packets to home agent 410 via reverse-tunnel 450. While reverse-tunnel 450 is often used to avoid egress and ingress firewall filters, it is also useful to avoid disclosing the true location of mobile node 402 to other nodes, such as to correspondent node 420.

In addition, although not explicitly illustrated as such, correspondent node 420 in FIG. 4 may also be a mobile node communicating with network 350 via a foreign agent in much the same manner as mobile node 402. Thus, mobility protocol 360 may serve to provide network-layer connectivity between two mobile nodes located within a no-sight routing ad-hoc sub-network.

For example, returning to mobile nodes 302 and 320 in FIG. 3, mobility protocol 360 may facilitate communication between these two mobile nodes using IP addressing over network 350. Specifically, by registering with router 304 (acting as a foreign agent) in the manner described above, mobile node 302 may receive a care-of IP address, enabling mobile node 302 to receive packets addressed to its home address and send packets to other nodes connected to network 350. Similarly, by registering with router 322 (acting as a foreign agent), mobile node 320 may also receive a care-of IP address, also enabling mobile node 302 to receive packets addressed to its home address. These mobile nodes may then transmit and receive packets to one another over network 350 by addressing these packets to each other's respective IP home address, either directly or via reverse-tunneling.

Accordingly, by integrating a mobility protocol at a network layer above sub-network 325, communication between two mobile nodes located outside of their respective horizon lines may be established. Such a system and method advantageously retains all of the beneficial properties of no-sight routing while adding the ubiquitous communication ability of mobility protocols. Specifically, because the addition of a mobility protocol still does not require the use of global LSUs, the sub-network-layer routing traffic associated with these global LSUs is eliminated, thereby allowing ad-hoc networks of arbitrarily large physical extent to be created without suffering from the various scalability, reliability and performance limitations discussed in connection with conventional link-state routing schemes. Thus, all nodes within sub-network 325 may be reachable from all other nodes—either through no-sight routing or via a mobility protocol—without having to pay the network overhead costs associated with conventional link-state routing techniques.

As described earlier; communication between distant nodes in sub-network 325 may also be facilitated through a dynamic addressing protocol such as DHCP (Dynamic Host Configuration Protocol). FIG. 5 depicts an exemplary physical infrastructure of a system 500 for implementing a dynamic addressing protocol 560.

Exemplary system 500 for implementing dynamic addressing protocol 560 comprises, among other things, oval-shaped mobile nodes 502, 506, 510, 512 and 520, and rectangular-shaped routers 504, 508, 514, 516, 518, 522, 524, 526 and 528, connected together via connections 501 to collectively form sub-network 325. Depending on the desired field of use, sub-network 525 may be connected to a larger network (such as the Internet), or it may not.

In the exemplary embodiment illustrated in FIG. 5, router 526 acts as a server for dynamic addressing protocol 560. Exemplary system 500 is not, however, limited to this configuration. For example, in certain embodiments, any one or more of routers 504, 508, 514, 516, 518, 522, 524, 526 and 528 may act as servers for dynamic addressing protocol 5.60. In addition, any one or more of routers 504, 508, 514, 516, 518, 522, 524, 526 and 528 may be configured to forward packets to servers residing inside or outside of exemplary sub-network 525.

Generally speaking, dynamic addressing protocol 560 operating at router 526 automatically assigns an address, such as IP address, to each mobile node within sub-network 525 in a manner well known to those of skill in the art. For example, upon connecting to sub-network 525, mobile node 502 may initiate a DHCP IP address assignment process by broadcasting a DHCP discovery packet to all nodes to which it is directly connected; namely, router 504. This discovery packet is then forwarded by router 504 to router 508, which then forwards this packet to router 516 and so on until it arrives at router 526. Upon receiving the DHCP discovery packet, router 526 acting as the DHCP server then assigns mobile node 502 an IP address based on various parameters identified by mobile node 502, such as the hardware address of mobile node 502.

In some embodiments, each router in sub-network 525 is notified of changes in the topology of sub-network 525 by router 526 (acting as the DHCP server). Various approaches for enabling groups of routers to learn about affiliated nodes by communicating with one another in this manner are known to those of skill in the art, including, for example, the use of flooded local bindings according to the OBS Mobility protocol. Although the use of these flooded local bindings in the OBS Mobility protocol results in increased state traffic between these routers, because these flooded local bindings are not part of the routing table of dynamic routing protocol 560, churn in local bindings will not cause churn in the routing table of dynamic routing protocol 560, such that these flooded local bindings will not impact the stability and scalability characteristics of system 500. OBS Mobility and local bindings are discussed in detail in U.S. patent application Ser. No. 09/736,827, entitled "NETWORK COMMUNICATION BETWEEN HOSTS", filed Dec. 14, 2000; U.S. patent application Ser. No. 09/736,807, entitled "DELIVERING MESSAGES TO A NODE AT A FOREIGN NETWORK", filed Dec. 14, 2000; U.S. patent application Ser. No. 09/737,108, entitled "PUBLISHING NODE INFORMATION", filed Dec. 14, 2000; and U.S. patent application Ser. No. 09/736,834, entitled "ROUTING MESSAGES BETWEEN NODES AT A FOREIGN SUB-NETWORK", filed Dec. 14, 2000.

As with mobility protocol 360, in order for a mobile node in sub-network 525 to receive an IP address from a DHCP server, this mobile node must be able to communicate with at least one router. Accordingly, in certain embodiments the propagation limits of each mobile node in exemplary sub-network 525 are chosen such that each mobile node can transmit and receive (i.e., establish two-way communication) with at least one router.

By assigning addresses to each node in sub-network 525 in the manner described above and further by enabling groups of routers to learn about affiliated nodes by communicating with one another, dynamic addressing protocol 560 thus enables communication between distant nodes in sub-network 525. For example, once mobile node 502 and mobile node 520 have each received an IP address from router 526 acting as a DHCP server, and once the details of these assigned addresses have been distributed to each router in sub-network 525, these mobile nodes may then transmit and receive packets to and from one another via the various routers distributed throughout the topology of sub-network 525.

Accordingly, by integrating a dynamic addressing protocol with a no-sight routing scheme, communication between two mobile nodes located outside of their respective horizon lines may be established. Such a system and method advantageously retains all of the beneficial properties of no-sight routing while adding the ubiquitous communication ability of dynamic addressing protocols. Specifically, because the addition of a dynamic routing protocol still does not require the use of global LSUs, the sub-network-layer routing traffic associated with these global LSUs is eliminated, thereby allowing ad-hoc networks of arbitrarily large physical extent to be created without suffering from the various scalability, reliability and performance limitations discussed in connection with conventional link-state routing schemes.

II. Exemplary Process Flow

Figure 6:
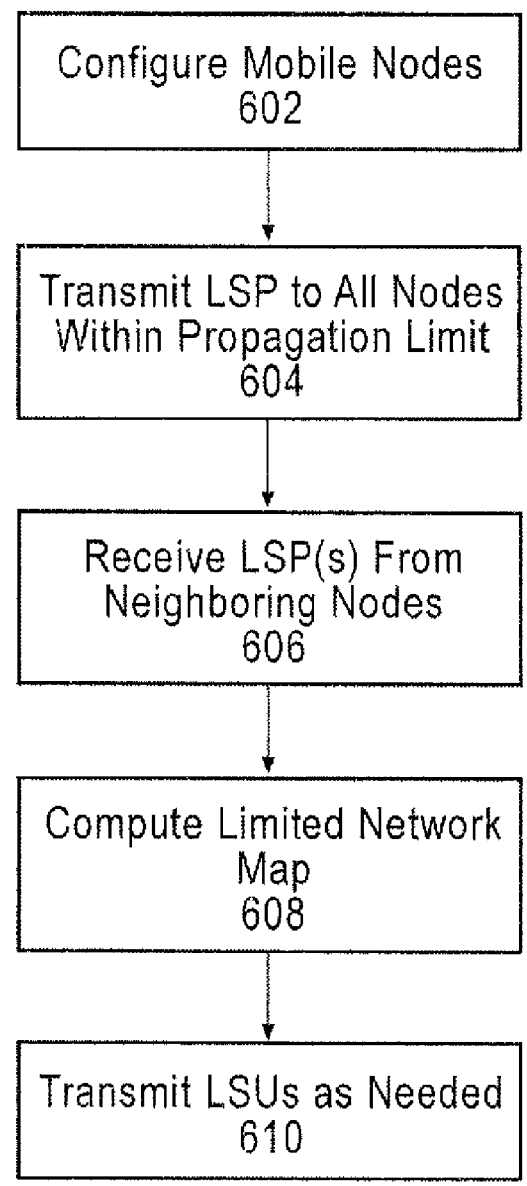
FIG. 6 depicts an exemplary process flow for performing no-sight routing.

FIG. 6 depicts an exemplary process flow 600 for performing no-sight routing. Process flow 600 is meant to serve merely as an example for how no-sight routing may be implemented, such that the various steps recited therein should not be deemed to limit the scope of its application. In addition, various other intermediary steps not explicitly illustrated in FIG. 6 may be performed as needed, regardless of their exclusion from FIG. 6.

At step 602, the various parameters of each mobile node are configured. In many embodiments, these parameters are configured by system administrators of the network and/or device manufacturers of the mobile nodes. According to certain embodiments, a propagation limit and/or an algorithm or heuristic for computing a propagation limit, as discussed above, is stored in the mobile node during step 602. As described in greater detail above, a mobile node may be assigned one or more propagation limits during this step for use in connection with all types of data to be transmitted by the mobile node. A mobile node may also be assigned a different propagation limit for each data packet type to be transmitted by this mobile node. In addition, although all mobile nodes within a network may be configured to have the same propagation limit, the propagation limits of each mobile node may be modified as needed.

Step 602 may occur in an automated fashion, such as by a computer, so that manual configuration is unnecessary. In addition, step 602 may be omitted from exemplary process flow 500 as needed, such as when propagation limits are to be dynamically assigned or adjusted based on network properties such as node density, as discussed in greater detail above.

Upon completion of step 602, control proceeds to step 604 where a mobile node transmits an LSP to all neighboring nodes. As described above, link-state packets typically contain data detailing the ID of the node that created the LSP and a list of directly connected neighbors of that node. In many embodiments, the travel of this LSP throughout the network is determined, as explained in greater detail above, by a propagation limit.

At step 606, LSPs from neighboring nodes are received. Again, due to the propagation limits placed on these LSPs, not all nodes connected to the network will receive all other nodes' LSPs. Upon receipt of these LSPs from neighboring nodes, at step 608 each node computes a limited network map based on the information received from each LSP received. As various topology changes to the network are perceived by a mobile node (i.e., a neighboring mobile node is added or removed), the mobile node generates and transmits to its neighboring devices LSUs detailing the changes that have been observed.

III. Alternative Embodiments

In accordance with the provisions of the patent statutes, the principles and modes of operation have been explained and illustrated. However, it should be understood that embodiments described herein may be practiced otherwise than is specifically explained and illustrated without departing from the spirit or scope thereof, and that the invention described herein is intended to be limited only by the following claims.

What is claimed is:

1. A system comprising:
    a first node configured to assign a first propagation limit to packets originating from the first node and transmit at least one packet according to the first propagation limit;
    a second node in communication with the first node and configured to assign a second propagation limit different from the first propagation limit to packets originating from the second node, receive the packets transmitted from the first node and transmit at least one packet according to the second propagation limit; and wherein the first propagation limit and the second propagation limit differ by no more than a ratio of a propagation parameter to a variation value, wherein the propagation parameter is greater than zero and the variation value is greater than or equal to one.

2. A system as set forth in claim 1, wherein the propagation parameter is based on at least one of a hop limit and a time-to-live value.

3. A system as set forth in claim 1, wherein the propagation parameter is based on a distance the packet has traveled from the first node.

4. A system as set forth in claim 1, wherein the propagation parameter is based on an aggregate bandwidth capacity of links over which the packet has traveled.

5. A system as set forth in claim 1, wherein the propagation parameter is based on a number of nodes through which the packet has traveled.

6. A system as set forth in claim 1, wherein the propagation parameter is based on an amount of time that has passed since the packet was transmitted.

7. A system as set forth in claim 1, wherein the variation value includes a predetermined amount of propagation limit variation.

8. A system as set forth in claim 1, wherein the first propagation limit is stored at the first node and the second propagation limit is stored at the second node.

9. A system as set forth in claim 1, wherein at least one of the first node and the second node is configured to transmit a different packet type and wherein at least one of the first propagation limit and the second propagation limit is different for each data packet type.

10. A system as set forth in claim 9, wherein the packet types include at least one of a link-state packet, a link-state update, a multicast member link-state update, a unicast data packet, and a multicast/broadcast data packet.

11. A system as set forth in claim 1, wherein at least one of the first propagation limit and the second propagation limit is dynamically adjusted based on a network condition.

12. A system comprising:
a first node configured to assign a propagation limit to a packet originating from the first node, address the packet to a second node beyond the propagation limit from the first node, and transmit the packet according to the propagation limit; and
a router node within the propagation limit of the first node, in communication with the first node and configured to receive the packet addressed to the second node and forward the packet to the second node at a different address than designated by the first node according to a higher-layer transport protocol.

13. A system as set forth in claim 12, wherein the propagation limit allows the first node to transmit data to at least one other node including the router node.

14. A system as set forth in claim 12, wherein the router node is configured to assign an address to the first node and the second node according to the higher-layer transport protocol.

15. A system as set forth in claim 12, wherein at least one of the first node and the second node is configured to register with the router node according to a higher-layer transport protocol.

16. A system as set forth in claim 12, wherein the first node is configured to at least one of receive at least one of link-state packet data and link-state update data from the router node and transmit said at least one of link-state packet data and link-state update data to the router node.

17. A system as set forth in claim 12, wherein the first node is configured to receive packets from the router node.

18. A system as set forth in claim 12, wherein the second node has a propagation limit that differs from the propagation limit of the first node by no more than a ratio of a propagation parameter to a variation value.

19. A system as set forth in claim 18, wherein the propagation parameter is greater than zero and the variation value is greater than or equal to one.

20. A system comprising:
a first node configured to transmit at least one packet according to a first propagation limit;
a second node in communication with the first node and configured to receive the packets transmitted from the first node and transmit at least one packet according to a second propagation limit; and
wherein the first propagation limit and the second propagation limit differ by no more than a ratio of a propagation parameter to a variation value, wherein the propagation parameter is greater than zero and the variation value is greater than or equal to one, wherein at least one of the first node and the second node is configured to transmit a different packet type and wherein at least one of the first propagation limit and the second propagation limit is different for each data packet type.

21. A system as set forth in claim 20, wherein the packet types include at least one of a link-state packet, a link-state update, a multicast member link-state update, a unicast data packet, and a multicast/broadcast data packet.

22. A system comprising:
a first node configured to address a packet to a second node and transmit the packet according to a propagation limit; and
a router node in communication with the first node and configured to receive the packet addressed to the second node and forward the packet to the second node at a different address than designated by the first node according to a higher-layer transport protocol;
wherein the first node is configured to at least one of receive at least one of link-state packet data and link-state update data from the router node and transmit said at least one of link-state packet data and link-state update data to the router node.

* * * * *